3,529,638
METHOD AND APPARATUS FOR SIMULTANEOUSLY ROTATING AND FILLING A CONTAINER
George Z. Angell and Herman Pesch, Fulton, N.Y., assignors to Phillips Petroleum Company, a corporation of Delaware
Filed Sept. 5, 1967, Ser. No. 665,387
Int. Cl. B65b 1/04, 3/04
U.S. Cl. 141—9                                11 Claims

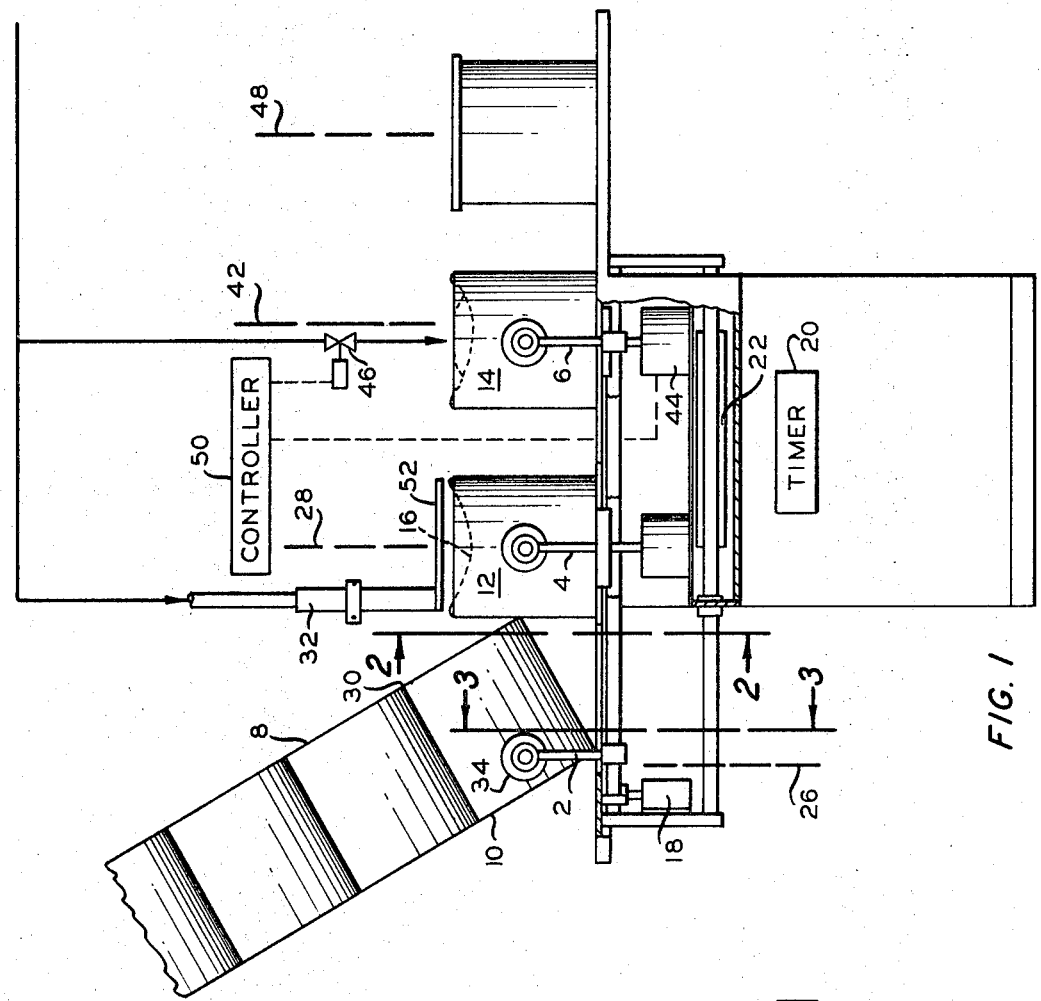
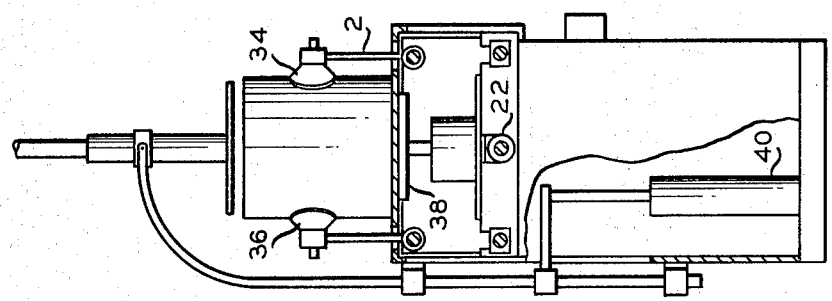
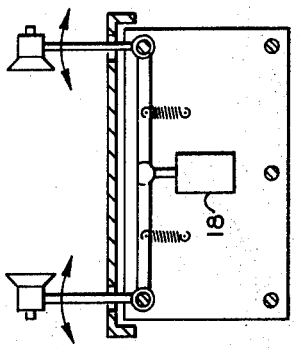
FIG. 1
FIG. 2
FIG. 3
INVENTORS
G. Z. ANGELL
HERMAN PESCH
BY
ATTORNEYS United States Patent Office 3,529,638
Patented Sept. 22, 1970

ABSTRACT OF THE DISCLOSURE

Method and apparatus for filling a container; a method comprising stepwise moving a container from a supply source to filling station, there supporting and rotating container while lowering filling spout thereinto in one modification to a peripheral point therein, and raising filling spout during filling of container while it is being rotated, thus providing a depressed area in the surface of the material which can be a fluid or semifluid, particle or other physical nature, in container, then moving container to combination weighing and adding station at which additional material is added into depression and then moving container to an inspection and/or closing station. The apparatus in one embodiment comprising in combination a hydraulic piston operated reciprocable conveying rack having clamping arms in one extreme position of said rack corresponding to each of said supply source, filling station, and said weighing and adding station in the other extreme portion of said rack respectively to said filling station weighing and adding station and said inspection and closing station, said apparatus also comprising suitable hydraulic controls and operation mechanism for actuating said clamping arms and moving said rack by way of said piston, there being positioned at said filling station a reciprocable filling spout adapted to be lowered into a container to be filled and to be withdrawn from said container while it is being filled and a guide plate attached to the filling end of said spout adapted to be lowered therewith into said container for maintaining said container in said position while it is being filled; and a rotating table at said filling station to rotate said container while it is being filled.

METHOD AND APPARATUS FOR SIMULTANEOUSLY ROTATING AND FILLING A CONTAINER

This invention relates to the filling of a container. It also relates to the filling of a container with a material which can be fluid, semi-fluid or of other physical nature. The invention also relates to a container filling apparatus.

In one of its concepts, the invention provides a method for filling a container with a material while simultaneously rotating the container, the filling of the container being accomplished from a point near its bottom upwardly, the filling and rotation being such that there is formed and remains at the surface of the material when a desirable amount of it has been filled in the container a depressed area, the method involves the further step of then filling an additional desired amount of material into said depressed area to provide a container filled with a desired amount or weight of said material. In another of its concepts, the invention provides a method as described in which the filling means is positioned at a point removed from the center of the container and near the bottom thereof and the filling means is gradually moved upwardly to fill the container at its side and from the bottom upwardly toward the top thereof while said container is being rotated. In a still further concept, the invention provides an apparatus for stepwise moving a container from a container supply source by means of clamping arms positioned along a reciprocable rack to a filling station, then from said filling station to a weighing and adding station and then from the latter to a closing station, the rack being operated in one embodiment by a hydraulic piston, a reciprocable filling spout being positioned at said filling station, a turn table upon which the container is placed by said clamping arms when delivered to said filling station, means for rotating said turn table when a container has been placed thereon and while said container is being filled and means for actuating said filling spout to lower the same into a position near the bottom said container there for raising the same gradually while filling said container while it is being rotated. In another of its concepts, the invention provides a guide plate or ring in combination with the filling spout, the plate so acting as to retain and to guide the cup during its rotary movement, and in a preferred form to, as it were, push downwardly on the material being filled to prevent its premature overflow from the cup as it is filled into and onto the peripheral portion thereof. In another of its concepts, the invention provides a container which has been so filled by causing its contents to somewhat exceed or at least reach the upper edge thereof, that upon application of the container lid, the contents will serve to seal the container against ingress of air.

It is known to fill a container from its bottom upwardly and while so doing to rotate the container. Such an operation and a machine for carrying it out is disclosed in U.S. Pat. 3,220,445, R. C. Taisey, issued Nov. 30, 1965.
It is also known to package a sundae by annularly filling a cup with ice cream by directing a quantity of ice cream against the sides of the cup and passing into a central portion of the cup an amount of topping so that topping in effect fills an upper central portion of the cup. See Pat. 2,486,194, F. T. Moser, issued Oct. 25, 1949.

In the filling of containers it is important to fill them with a proper amount or weight of material, for example for sale to the consumer the container must contain that amount of product which is indicated on the container label. Further, when the product is perishable as by oxidation due to entry of atmospheric air thereinto, it is important that the product be filled snug to the seal so as to prevent the further migration of atmosphere into the main body of the product in the container.

We have now conceived a method and apparatus as further set forth and described herein and in connection with the drawings according to which a material or product such as ice cream can be fed preferably peripherally from the bottom upwardly into a container while the container is being rotated, the container being moved successively from a supply source to a filling station, from the filling station to a weighing and adding station, there being added at the weighing station an additional amount of product, e.g., ice cream, into a depression in the surface of the ice cream filled into the container at the filling station, an additional amount of ice cream to bring the container contents up to at least the weight indicated on the container.

It is an object of this invention to fill a container. It is a further object of this invention to provide a method for filling a container. A further object is to provide a method for filling a container in a manner to provide in the surface of material in a desirably filled container a depression. It is a still further object of the invention to provide a method wherewith to fill a container in a series of steps accurately to contain an indicated weight. It is also an object of this invention to provide an apparatus for filling containers. It is a further object of this invention to provide an apparatus for filling a container in successive steps to provide therein an exact amount or weight of contents. It is a further object of this invention to provide automatic apparatus for moving a container through a series of stations in which the container is filled, weighed, and further filled to an accurate weight. A still further object of the invention is to provide a container containing contents in which the contents have been so filled therein that the contents aid in preventing the ingress of air into the container at the interface between the container wall and the container lid.

Other aspects, concepts and objects of this invention are apparent from a study of this disclosure, the drawing and the appended claims.

According to the present invention, there is provided a method for filling a container which comprises filling said container while it is being rotated so that in a desirably filled condition of the container there has been formed in the surface of the material filled thereinto a depression, weighing the container and then filling into said depression an additional desirable weight of material to reach a desirable final weight of the container contents. Further according to the invention there is provided a method of so filling the container while rotating the same as when a container is being filled with a semi-fluid substance which will flow somewhat, but which will hold its configuration, e.g., ice cream which when refrigerated will hold its shape and configuration, that the semifluid at least reaches up to the top edge and preferably somewhat exceeds the top edge of the container so that upon placing the container cover or lid on the container, the semi-fluid will be in contact with the lid and with the container wall whereby to prevent ingress of air at the interface between the container cover and container wall. Still further according to the invention there is provided a container and contents in which the contents as these may be solidified in the container are snug up against the container lid around the periphery of the contents thus preventing the ingress of air at the interface between the container wall and the container lid. Further according to the invention there is provided an apparatus comprising in combination means for moving a container to a filling station, means at said filling station on which to place said container and with it to rotate said container, filling means for filling material into said container while the same is being rotated, means for moving said container to a weighing station, means at said weighing station for weighing said container and means for adding an additional amount of material into the depression in the surface of the material in said container.

The drawing shows an embodiment of the invention in which ice cream containers are first filled from a peripheral point with sufficient product to raise it somewhat above the very edge of the top of the container, whereupon additional ice cream is placed into the depression which is visible in the surface of the product on the drawing. FIG. 1 is a side elevational view of the apparatus of an embodiment of the invention. FIG. 2 is an end elevational view of a portion of FIG. 1 taken along line 2—2 when there are on containers in the container supply rack. FIG. 3 is a schematic elevational cross cut of a portion of the control mechanism of the apparatus.

Referring now to the figures of the drawing, in operation timer 20 actuates solenoid air valves, not shown for sake of simplicity, which control air flow to air cylinders 18 and 22 which operate the intermittent conveyor. Initially clamping arms 2, 4, and 6 move together to grip containers 10, 12, and 14 respectively. Next air cylinder 22 moves arms 2, 4, and 6 so as to move the containers forward one station. The arms then move apart, releasing the containers, and are returned to their original position by air cylinder 22 ready to close on containers 8, 12, and 14. As tilted container 8 is moved by the conveyor from the container feeding station 26 to the filling station 28, its rim 30 contacts reciprocable filling tube 32 and is pivoted about clamp points 34 and 36 into a vertical upright position just prior to being placed onto rotating platform 38. At the filling station 28, the filling tube 32 is lowered to near the bottom of the container by air cylinder 40 and is raised at the same rate the container fills. This prevents air entrapment resulting from splashing. The container is rotated as it fills creating a vortex which leaves a depressed area 16 in the center when the semifluid being charged to the container is level with or slightly above the rim. A ring 52 attached to filling tube 32 guides the container from the inside as it rotates. The container is then moved by the conveyor to the weighing and vernier filling station 42 and a new unfilled container is moved under the filling tube at such a rate that, although the material, e.g., ice cream, is still flowing from the tube, none falls outside the new container. At station 42 the container sets on a load cell 44 which signals a controller 50 to operate a solenoid operated product valve 46 which adds material to the central depressed area 16 of the near full container until a predetermined weight is reached then the controller closes the product valve 46. The conveyor then moves the filled container to an inspection and capping station 48.

EXAMPLE

Fiber board bulk ice cream containers 9½ inches in diameter and having about a 3-gallon capacity are filled at the rate of 600 per hour by the apparatus described above. Each container is moved beneath the continuously flowing 2½-inch in diameter main spout and is uprighted by it. The spout is lowered 9 inches in about ½ second then raised 9 inches at the rate of about 2 inches per second to a position slightly above the top of the container. Immediately at the end of the spout's upward movement the conveyor moves the filled container to the weighing and vernier filling station and moves an unfilled container beneath the main spout. During the lowering and raising of the spout, the container is rotated about its vertical axis at about 1 revolution per second.

Ice cream flows from the spout at the rate of about 1.9 feet per second. The density will vary from about 4.75 lb./gal. to about 5.25 lb./gal.

The rate and distance the spout is raised and the frequency of the conveyor motion is pre-selected based on the volume output of the freezer (in this case about 1800 gallons per hour) and the container depth and capacity (in this case about 9¾-inches and three gallons respectively).

Since the soft frozen ice cream is sufficiently plastic to be shaped to some extent by centrifugal and gravitational forces, it fills the body of the container, but since the filling spout is off-center in relation to the axis of the rotating container, the top most portion, lacking sufficient forces to cause it to flow, remains piled higher near the wall of the container where it is deposited, leaving a depression in the central portion of the container. The surface of the ice cream in the depressed area is about ¾-inch lower than that of the ice cream near the walls. When the container comes into place on the weighing mechanism below the vernier filling spout, the wernier filling spout valve is opened whenever the container is under weight and ice cream flows from the valve at the rate of about 86 gal./hr. until the container and contents reach the predetermined weight or until the conveyor engages the container to move it. The container is next moved to an inspection and capping station where a lid is manually placed on the container, then the filled capped container is removed from the inspection and capping station and taken to a freezing room where the temperature of the soft frozen ice cream is reduced to harden it.

One skilled in the art in possession of this disclosure having studied the same will recognize that various changes can be made for various portions of the apparatus without departing from the scope of the appended claims. The particular filling spout which may be employed or its positioning in the container can be varied. Although it is now preferred to position the filling spout peripherally in the container, it is clear that the filling spout can be otherwise positioned. For example, the filling spout could be centrally located if the viscosity of the ice cream or other material being filled and/or angular velocity of the container and its contents are suitably selected.

Various portions of the mechanism and details of operational adjustments which may be supplied by one skilled in the art having studied this disclosure have been omitted for sake of simplicity. For example, the ring 52 which centers and guides the container from the inside as it rotates as has been described advantageously is provided with a surface such that the material being sealed into the container as it approaches its top will have acting on it a downward force to cause the material to be pushed against the upper edge of the container wall. This will aid in distributing the material within the container and in the preferred embodiment of the invention to help provide the improved seal which prevents engress of air at the interface between the cover and the wall of the container.

The semi-fluid material being packaged must be fluid to the extent that when packaging normal quantities of the material it assumes the shape of the container under the action of gravitational force, but semiplastic to the extent that some small quantity of the material near the upper surface of the mass of material will not flow under the action of gravitational force so the surface of the mass of material can be made irregular and hold its irregularity until altered by a force other than that exerted by gravity. It should be a thixotropic material. Its consistency should be similar to that of mashed or whipped potatoes or soft frozen ice cream.

The rotational speed of the container can and usually is adjusted with respect to the consistency or fluicity of the material filled into it and usually will vary depending on the consistency of the material and the diameter of the container. Ordinarily a rotation within the approximate range of 0.1 revolution per second to 10 r.p.s., preferably 0.5 to 3 r.p.s. is employed.

While there has been shown in the drawing a reciprocable filler spout off-set with respect to the center of the container to be filled, it is within the scope of the invention to provide different filler mechanism per se. In its preferred form, however, the filler spout will be and operate as shown in the drawing and as described in the description of the drawing.

Reasonable variation and modification are possible in the scope of the foregoing disclosure, the drawing and the appended claims to the invention, the essence of which is that there have been provided a method for filling a container from its bottom upward while rotating the same thereby to produce a depression in the surface in the material in the container albeit in the preferred form of the method the contents of the container will exceed somewhat or at the very least reach the upper edge of the container following which a predetermined portion of additional material is filled into said depression to arrive at an exact contents or weight for the container; that an apparatus substantially as described comprising means for conveying the container and positioning the same respectively at a filling station, at a weighing and adding station, and at an inspection and closing station, means for rotating the container at the filling station while it is being filled, reciprocable means for filling the container, etc., substantially as described herein, and a filled container have been set forth and described.

We claim:

1. A method for filling a container which comprises rotating said container, while it is being rotated filling into said container a flowable but not liquid material which will flow under action of a centrifugal force, subjecting said material in said rotating container to the action of a centrifugal force thus engendered, continuing to fill said material into said container until material at the periphery of said container has reached a desired depth thus forming due to said centrifugal force in the surface of the material filled thereinto a depression, weighing the container and then filling into said depression an additional desirable weight of material to reach a desirable final weight of the container contents.

2. A method according to claim 1 wherein the container is filled to an extent such that the contents at least reach the top edge of the container so that when placing a cover on the container the material in the container effects a seal of the interface between the container cover and container wall to prevent ingress of air at the interface between said cover and said wall.

3. A method according to claim 1 wherein the container is moved from a container supply source to a rotation and filling station, is filled while being rotated, is then moved to a weighing station, weighed and a sufficient amount of additional material is added into the depression in the surface of the material in the container to reach a desired final weight of material in the container.

4. A container filled according to the method of claim 2 wherein the container is covered with a container cover in said container the container contents is in sealing contact with the container cover at the periphery of said cover.

5. An apparatus for automatically carrying out the method of claim 1 comprising in combination means for supplying periodically a container, means for periodically moving said container first to a filling station then to a weighing station and then to a closing station, means at said filling station for rotating said container to engender in a material filled thereinto a centrifugal force to cause said material to flow to the periphery of the container thus forming a depression in the central portion of said material, means at said filling station for filling said container while it is being thus rotated, means at said weighing station for weighing said container, means at said weighing station for adding to a filled container an additional amount of material in an amount such that a final desired weight of contents is reached, and means coacting with said means for moving said container, and with said means for filling and means for adding, to render these operative in cyclic and coordinated manner.

6. An apparatus according to claim 5 wherein at said filling station there is provided a means for centering and retaining contered said container with respect to said means for rotating.

7. An apparatus according to claim 6 wherein said means for centering is provided with a surface which extends at least to the top of said container such that the material being filled into the container as it approaches the top of the container will have acting on it due to said surface a downward force to cause the material to be pushed against the upper edge of the container wall.

8. An apparatus according to claim 5 wherein the filling means at said filling sation is reciprocable to permit filling the container from the bottom upward.

9. An apparatus according to claim 5 wherein said filling means at said filling station is positioned off center respective to the container on the means for rotating in a manner to fill from said filling means to a peripheral point in the container.

10. An apparatus according to claim 5 wherein said means for periodically moving comprises a rack, said rack is equipped with clamping arms, said rack is movable with aid of a hydraulic mechanism and said mechanism is timed and controlled with a timer controller means and wherein said means for adding is controlled responsive to the weight of the container at said means for weighing, said means for adding is controlled responsive to said means for weighing so as to add a desired additional amount of material to the container said mechanism is timed to move the rack when a container has been supplied there to, and then again when said container has been filled to a desired weight.

11. A method for filling a container with a semi-fluid so as to cause said semi-fluid to espouse the container wall and to form a depression in the surface thereof and to maintain said depression during and for a time after the container has been filled to a predetermined level, which comprises rotating said container at an angular velocity sufficient to cause said fluid to espouse the wall of the container owing to the centrifugal force engendered by said rotating and to prevent during said time a portion of said semi-fluid from migrating to the central portion of said container thus causing said depression to be formed and maintained during said rotating, then during said time filling into said depression a second fluid to a pre-determined level.

References Cited
UNITED STATES PATENTS

| | | | |
|---|---|---|---|
| 1,218,416 | 3/1917 | Krarup | 141—12 |
| 2,486,194 | 10/1949 | Moser | 141—103 X |
| 3,115,165 | 12/1963 | Cunningham et al. | 141—83 |
| 3,124,916 | 3/1964 | Anderson et al. | 53—37 |
| 3,220,445 | 11/1965 | Taisey | 141—159 |
| 3,408,787 | 11/1968 | Mueller | 53—37 |

HOUSTON S. BELL, JR., Primary Examiner

U.S. Cl. X.R.

141—34, 83, 159, 165, 183; 53—37, 281.